Nov. 7, 1933.  R. S. HOPKINS  1,933,807
PHOTOGRAPHIC CAMERA AND MAGAZINE CONSTRUCTION
Filed Dec. 29, 1928    2 Sheets-Sheet 1

Inventor,
Roy S. Hopkins,
By Newton M. Perrins
Donald H. Stewart.
Attorneys

Nov. 7, 1933.      R. S. HOPKINS      1,933,807
PHOTOGRAPHIC CAMERA AND MAGAZINE CONSTRUCTION
Filed Dec. 29, 1928      2 Sheets-Sheet 2
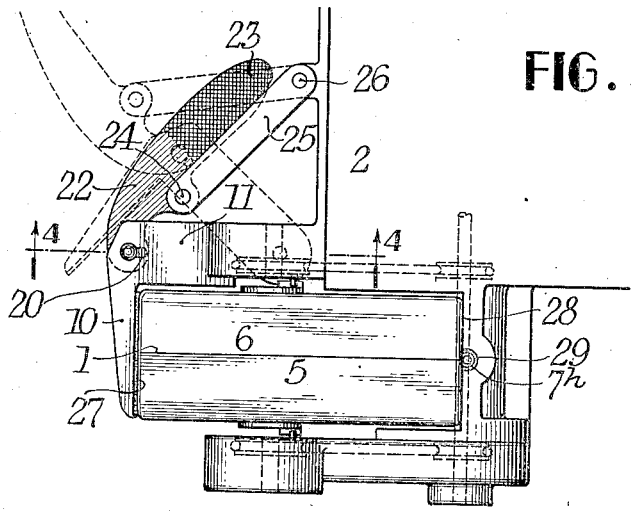
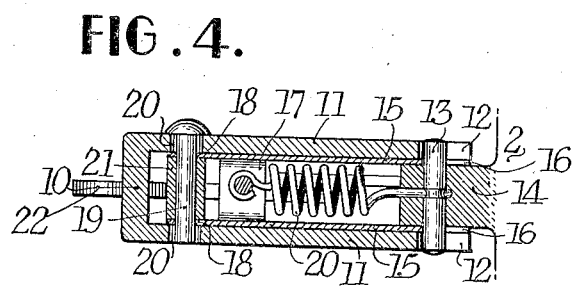
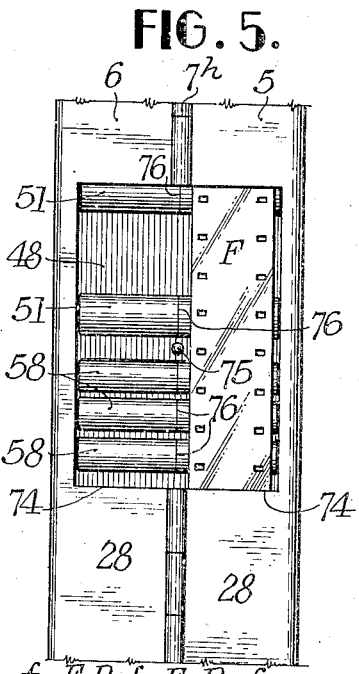
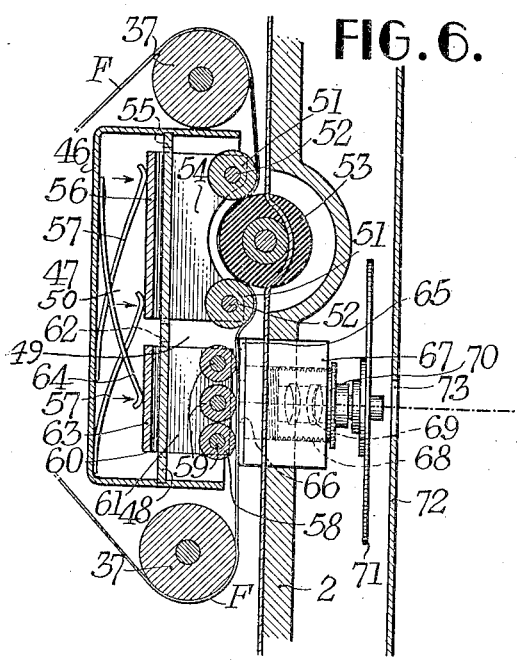
Inventor
Roy S. Hopkins, Patented Nov. 7, 1933

1,933,807

UNITED STATES PATENT OFFICE 1,933,807

PHOTOGRAPHIC CAMERA AND MAGAZINE CONSTRUCTION

Roy S. Hopkins, Rochester, N. Y., assignor to Eastman Kodak Company, Rochester, N. Y., a corporation of New York Application December 29, 1928
Serial No. 329,144

30 Claims. (Cl. 95—34)

This invention relates to photography and more particularly to a photographic camera and magazine construction. One object of my invention is to provide a magazine which may be quickly and easily affixed to a camera in an operative position. Another object is to provide a magazine guide and positioning device on which the magazine may slide towards a support. Another object of my invention is to provide a magazine with a short length of film exposed on one side thereof and arranged so that by moving the magazine up against a support the film will contact with a film-driving roller on the support, thus eliminating all threading of the film through various guideways and sprockets. Another object of my invention is to provide movable parts on a magazine position so that movable parts on the support will automatically come in contact when the magazine has been moved to an operative position. Another object of my invention is to provide a resilient magazine clamp which constantly presses a magazine against a support when the magazine is in an operative position. Another object of my invention is to provide a series of resiliently mounted rollers adapted to hold film upon the driving roller and adapted to hold film flat over an exposure frame when the magazine is in an operative position. Still another object of my invention is to provide a support with a film-moving device and an exposure frame in front of which there is an objective and shutter, both the film-moving device and the exposure frame projecting from a support in position to be contacted with a film carried by a magazine, and other objects will appear from the following specification, the novel features being particularly pointed out in the claims at the end thereof.

The camera and magazine construction described in this specification were primarily designed for a recording machine of the type disclosed in my copending application, Serial No. 237,467, filed December 3, 1927, which is suitable for machines for producing photographic records of documents, although obviously certain features of the present invention are also equally suitable for other types of cameras.

Coming now to the drawings wherein like reference characters denote like parts throughout,—

Fig. 3 is a top plan view showing the magazine-holding clamp which resiliently presses the magazine into a seat formed for the magazine in the support;

Fig. 4 is an enlarged detail sectional view through the clamp on line 4—4 of Fig. 3;

Fig. 5 is a fragmentary front elevation of a portion of a double magazine, such as shown in Fig. 1, a film being carried by one side only of the magazine;

Fig. 6 is an enlarged fragmentary sectional view of a portion of the film-holding structure of the magazine and of the parts with which the film contacts on the support; and Fig. 7 is an enlarged fragmentary side elevation of the friction film-driving roller, the position of films driven thereby being indicated.

In recording machines such as are used in banks for making photographic records of checks and other documents, it is necessary to provide a simple loading device by which film may be positioned for exposure quickly and with the minimum effort.

Figure 1:
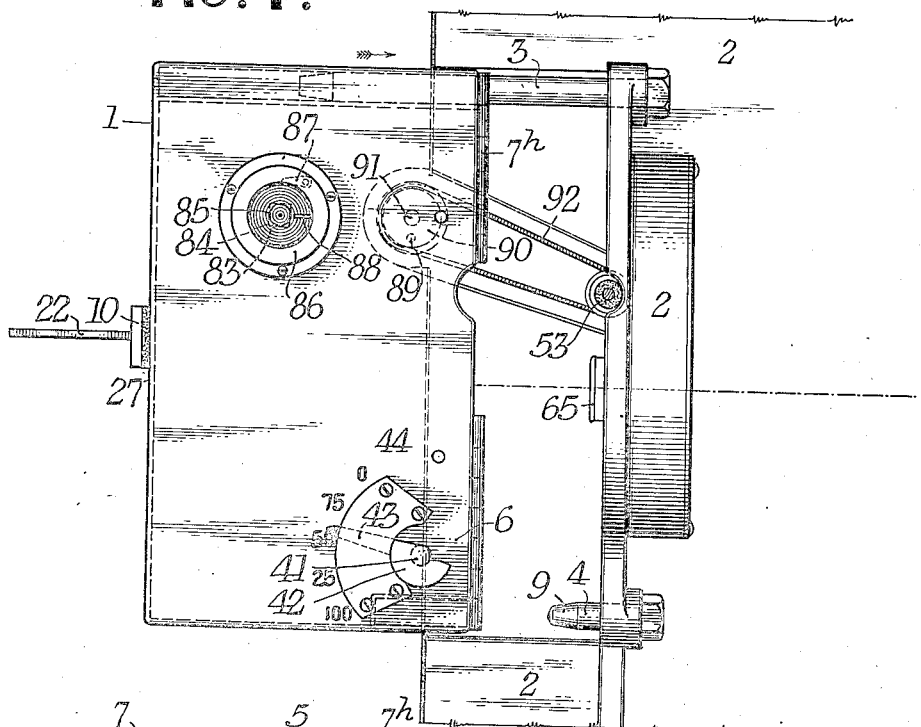
Fig. 1 is a side elevation, partially in section, showing a support and a camera magazine moved partially into its operative position, the support and magazine illustrating a preferred embodiment of my invention.

In Fig. 1 the magazine broadly designated as 1 may be readily positioned on the support 2 which may form a rear wall of a photographing camera.

The support 2 is provided with a main guiding post 3 and a supplementary positioning post 4, post 3 projecting a considerable distance from the support and post 4 only projecting a short distance therefrom.

Figure 2:
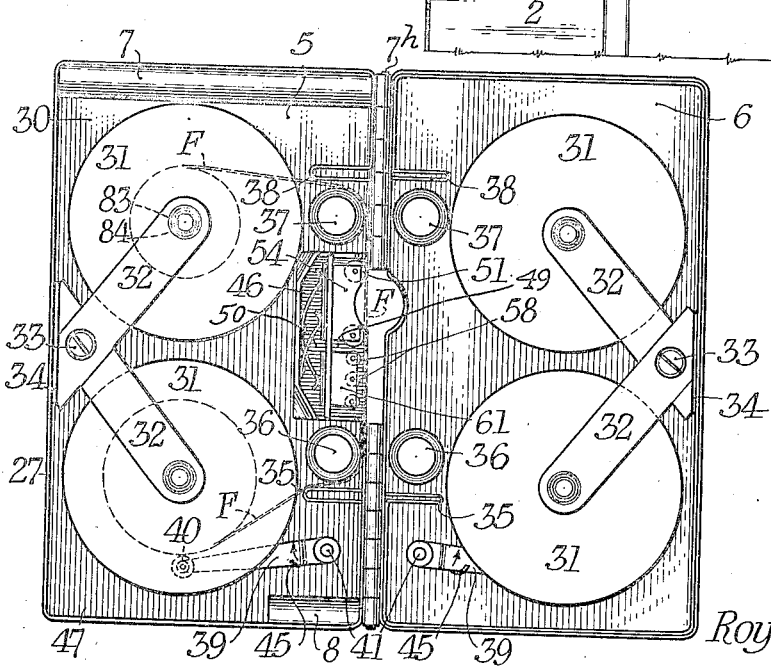
Fig. 2 is a top plan view of a double magazine open as for loading, the magazine being similar to that shown in Fig. 1.

As shown in Fig. 2, one side 5 of the magazine is hinged to a second side 6 at 7$^h$. For a double magazine as shown, two of these sides are provided, but if a single magazine is to be used, a cover may be substituted for the side 6.

One side of the magazine 5 may be provided with a pair of tubular members 7 and 8 of such size that they will slide freely over the posts 3 and 4. In order to position the magazine on the support, it is only necessary to enter the post 3 in the tube or opening 7 and slide the magazine in the direction shown by the arrow, Fig. 1, upon the track which is formed by the post 3. As the magazine nears its operative position, the beveled edge 9 of the positioning post 4 enters the tubular member 8 and accurately locates the magazine on its support.

In order to hold the magazine in an operative position, a resilient clamp is used, as shown in Figs. 3 and 4. This clamp consists of a clamp arm 10 which is an extension from a bifurcated arm 111 which is provided with open slots 12 adapted to engage a pin 13 passing through a lug 14 carried by the support 2. Inside of the bifurcated arms 11 there is a U-shaped member, the arms of which 15 are likewise provided with slots 16 engaging pin 13. A cross bar 17 unites these two sides and apertures 18 closely engage the sides of a pin 19 which also passes through slots 20 in the arms 11.

Both of the members above described may, therefore, slide freely upon pin 13 and the arms 11 may slide about pin 19, whereas the arms 18 carry the pin rigidly. A spring 20 connects the cross bar 17 with the pin 13 so that there is a constant tendency to draw pin 19 towards the support 2.

The pin 19 is also rigidly held by means of a post 21 through which the pin 19 passes, this post forming a portion of a handle 22 which is serrated at 23 to facilitate operating. Handle 22 is pivoted at 24 to a link 25 which in turn is pivoted at 26 to a part of the support 2.

Thus by moving the handle 23 from the broken-lined position, Fig. 3, to that shown in full lines in the same figure, the clamping bar 10 will engage the back wall 27 of the magazine and the spring 20 will exert a constant pull upon the post 19 and will, by engaging the end of the slot 20, draw in upon the clamping bar 10 so as to resiliently hold the magazine in a seat 28 formed for it in the support 2. The seat 28 is provided with a cut-out 29 having the useful function of acting as a light stop in case a single magazine is employed, since a similar shaped hinge may, of course, be used for a single magazine cover.

Referring to Fig. 2, the magazine itself may consist of a box-like receptacle 30 in which a pair of film reels 31 may be mounted on posts of any standard type upon which they may be held by clamping bars 32, which may be fastened at 33 to a block 34 carried on the rear wall 27 of the magazine. From the lower film reel the film indicated in broken lines at F may be led past a light-stopping guide 35 over a roller 36 straight upwardly over a second roller 37 past a second light-stopping guide 38 and thence to the upper roller 31.

On the lower roller there is preferably provided an arm 39 having a roller 40 adapted to lie in contact with the convolution of film and being supported by a shaft 41. Shaft 41, as indicated in Fig. 1, extends through the walls of the magazine and terminates in a plate 42 and an indicating arm 43, the latter operating over a scale 44 on the outside of the magazine to show the amount of film in the magazine.

The arms 39 are spring-pressed in the direction shown by arrows, only the end of the spring 45 showing in Fig. 2. The plate 42 is of irregular shape and is adapted to contact with an automatic machine control which forms the subject matter of my copending application, Serial No. 329,145, filed December 29, 1928, for Automatic control for photographic recording machines.

As thus far described, both sides 5 and 6 of the double magazine are exactly alike. One side, however, must be provided with a film-positioning device and if the magazine is a single one, this device will lie wholly within the box-like structure on one side. But if it is a double one, as shown in Fig. 5, the positioning roller, while attached to only one side, will extend across both sides, as will be hereinafter more fully described.

As shown in Figs. 2 and 6, a small box-like structure 46 extends upwardly from wall 47 of the magazine and this box-like structure is provided with a wall 48 dividing it into two sections 49 and 50. In section 49 there are a pair of rollers 51 mounted on shafts 52 positioned radially of a frictional film-driving roller 53. Shafts 52 are carried by side walls 54 of a U-shaped member, these side walls passing through slots 55 in the partition 48. A rear wall 56 connects the side walls 54.

As shown best in Fig. 6, in the rear chamber 50 there is a pair of spring fingers 57 which press the rear wall 56 in the direction shown by the arrows. These springs form a type of universal joint which permits considerable movement of the carriage for the rollers 51 which is formed by the side walls 54 and the rear wall 56.

Thus, as the magazine is moved toward its support, the rollers 51 are permitted sufficient movement to seat themselves against the frictional driving roller 53 and to press a film firmly thereon.

A second set of rollers 58 are carried by shafts 59, which are supported on a carriage 60, the side arms of which 61 pass through slots 62 and the rear wall of which 63 is pressed by a spring arm 64 in the direction shown by arrow. This set of rollers is adapted to press a film F flat against an exposure frame 65.

This frame is merely a flat plate in which there is a window 66 through which an exposure may be made and it is fastened to a block 67 which is inserted in or which may form a part of the support 2. This block is apertured and the front part of the aperture is threaded, as indicated at 68. An objective 69 is carried by a cell 70 which is screwed into the threaded aperture. Thus the block constitutes a small camera when the magazine is in place and a film F is pressed over the exposure aperture 66.

In front of the objective there is a shutter formed of an apertured disc 71, but since this type of shutter is well known in the photographic art, it will not be further described. The shutter lies close to a light-protecting plate 72 which is apertured at 73 to permit an image to be photographed therethrough.

As shown in Fig. 5, the rollers 51 and 58 extend across the front of apertures 74 cut in the front walls 28 of the magazine sections 5 and 6, which are hinged together at 7. If desired, a post 75 may be placed on the partition wall 48 so as to keep the films F from riding over. As also shown in Fig. 5, the rollers 51 and 58 are preferably divided into two parts on a central line 76, these two parts being both mounted on a single shaft.

The reason for this is that it permits two films to be threaded more easily. I prefer to make the rollers 51 and 58 of an especially treated wood which is smooth and which does not require lubrication, and I prefer to make the friction-driving roller 53 of rubber.

As shown in Fig. 7, I prefer to make the periphery of the roller in the form of three ridges or projections 77, 78 and 79, leaving portions of smaller diameter 80 and 81 between these ridges thus roller 53 has a relieved periphery. This permits the friction roller to contact with only the edges of the film F and leaves the sensitive picture area P free from contact with the driving roller, so that no part of the surface used for making a photograph comes in contact with the friction drive.

Since the rollers 59 contact across the entire width of a film 50 held against the exposure frame 65, the film is prevented from buckling and is held flat in the focal plane of the objective 69.

In order to wind the film on a take-up roller which is the upper roller, as viewed in Fig. 2, a shaft 83 is provided with a four-sided portion 84, as indicated in Fig. 1, this portion engaging a square aperture in a flange of the film reel 31 in a well known manner. Affixed to shaft 83 is a ratchet wheel 85, this wheel turning in a cell 86 in which there is mounted a pawl 87 which prevents the spool from being turned in one direction.

Ratchet wheel 86 has affixed thereto a flange 88 and this flange may be engaged by a driving pin 89 carried by a pulley 90 mounted to turn upon a shaft 91 and which may be operated by a spring belt 92, which may be driven by any suitable source of power.

It will be evident that when the magazine 1, as indicated in Fig. 1, is guided into its seat upon the track 3, that the flange 88 will lie in the path of the driving pin 89, since the shafts 83 and 91 are coaxial when the magazine is in its operative position. When the machine starts, therefore, pin 89 will be brought into engagement with flange 88 and will turn the take-up spool.

Should the flange 88 contact with the pin 89 as the magazine is loaded, the pin will be thrust to one side as some movement is permitted due to the pulley 90, which may be slipped relative to the belt 92, since this belt is comparatively loose. The size of the pulley and power drive is arranged so that the spool 31 will always tend to move slightly faster than film can be taken up. Therefore, it is necessary to arrange the belt 92 with a certain slippage which will compensate satisfactorily for the varying diameter of the take-up roll.

It should be especially noticed with the construction above described that it is only necessary to enter the post 3 in aperture 7 and slide the magazine into its seat 28, after which handle 23 may be moved to resiliently clamp the magazine in place. This action not only positions the magazine, but it stretches the film resiliently about the friction film drive 53 and also presses the film flat against the exposure window 67. The take-up film spool drive is also automatically positioned by this movement so that the driving flange 88 lies in the path of the driving pin 89. Thus the single operation of positioning the magazine equips the camera for taking pictures.

Having thus described my invention, what I claim as new and desire to secure by Letters Patent is:

1. In a magazine camera, the combination with a support carrying a shutter, objective, exposure gate and film-moving member, of a carrier movable relative to the support including a film holder, and film pressers for holding film against the exposure gate and film-moving member, and slidable connections between the carrier and support including a post on one member projecting out a material distance therefrom, and a socket fitting the post in the other whereby the carrier may be guided to an operative position on the support.

2. In a magazine camera, the combination with a support carrying a shutter, objective, exposure gate and film-moving member, of a carrier movable relative to the support including a film holder and film pressers for holding film against the exposure gate and film-moving member, and slidable connections between the carrier and support including a post projecting out a material distance from one member and a socket fitting the post in the other, and a locating protuberance and socket for positioning the carrier on the support as the carrier is slid on the post to an operative position.

3. In a magazine camera, the combination with a support including a power driven friction wheel for driving film and a power driven eccentric stud, of a magazine movably mounted with respect to said support, a film take-up shaft in the magazine including an eccentric lug, a presser carried by the magazine, means for simultaneously aligning the eccentric studs and film presser and friction roller by moving the magazine on its movable mount toward the support.

4. In a magazine camera, the combination with a support having a seat therein, of a magazine adapted to be mounted in the seat, and a resilient clamp adapted to press the magazine into an operative position in the seat.

5. In a magazine camera, the combination with a support having a seat therein, of a magazine adapted to be mounted in the seat, a post extending from the support, said magazine having an aperture adapted to engage said post whereby said magazine may be slid upon said post into said seat.

6. In a magazine camera, the combination with a support having a seat therein, of a magazine adapted to be mounted in the seat, a post extending from the support, said magazine having an aperture adapted to engage said post whereby said magazine may be slid upon said post into said seat, and a clamp for holding said seated magazine.

7. In a magazine camera, the combination with a support having a seat therein, of a magazine adapted to be mounted in the seat, a pair of posts of different lengths extending from the support, said magazines having apertures adapted to engage said posts one before the other, whereby the magazine may be slid toward the support on one post and may be located by the other.

8. In a magazine camera, the combination with a support, of a magazine adapted to slide to and from the support, slidable connections between the support and magazine including cooperating pins and sockets carried by the two parts, one pin and socket being engageable in advance of the other.

9. In a magazine camera, the combination with a support including a friction film-driving wheel, and a film gate, of a magazine, a slidable connection between the magazine and support, a plurality of rollers mounted in sets on two supports in the magazine, one set of rollers being adapted to resiliently press film on the friction film-driving wheel and the other set being adapted to press a film flat over the exposure aperture when the magazine is slid against the support.

10. In a magazine camera, the combination with a support including a friction film-driving wheel, and a film gate, of a magazine, a movable connection between the magazine and support, a pair of supports resiliently carried by the magazine, a plurality of rollers carried by the supports, said rollers being guided toward the friction film-driving wheel and the film gate to press film thereagainst by moving the magazine on its movable connection with the support.

11. In a magazine camera, the combination with a support including a frictional film-driving wheel, of a relieved periphery for the driving wheel, a movably-mounted film magazine adapted to move to and from an operative position against the support, and means for resiliently pressing the film upon the friction roller carried by the magazine and operable when said magazine is moved into an operative position.

12. In a magazine camera, the combination with a support including a frictional film-driving wheel, of a relieved periphery for the driving wheel, a movably-mounted film magazine adapted to move to and from an operative position against the support, and means for resiliently pressing the film upon the friction roller comprising a plurality of rollers mounted on a carrier, and a spring mount for the carrier whereby film may be resiliently pressed on the frictional roller.

13. In a magazine camera, the combination with a support including a frictional film-driving wheel, of a relieved periphery for the driving wheel, a movably-mounted film magazine adapted to move to and from an operative position against the support, and means for resiliently pressing the film upon the friction roller comprising a pair of spaced parallel rollers, supported by a carriage and leaf springs pressing on the carriage whereby a film may be resiliently pressed against the frictional film-driving roller.

14. In a magazine camera, the combination with a support including a film-driving member, and an exposure frame plate, of a magazine movably mounted with respect to the support, means carried by the magazine and operable through moving the magazine to an operable position against the support for holding film flat on the exposure plate, said means including a plurality of closely mounted parallel rollers.

15. In a magazine camera, the combination with a support including a film-driving member, and an exposure frame plate, of a magazine movably mounted with respect to the support, means carried by the magazine and operable through moving the magazine to an operable position against the support for holding film flat on the exposure plate, said means including a plurality of closely mounted parallel rollers, and a carriage for said rollers movably mounted on the magazine, said carriage being spring-pressed in one direction.

16. In a magazine camera, the combination with a support including a film-driving member, and an exposure frame plate, of a magazine movably mounted with respect to the support, means carried by the magazine and operable through moving the magazine to an operable position against the support for holding film flat on the exposure plate, said means including a plurality of closely mounted parallel rollers, and a carriage in which said rollers are rigidly mounted, and a spring for pressing the rollers toward the exposure frame plate.

17. In a magazine camera, the combination with a support including a film driving member, an objective, and an exposure frame plate fixedly located with respect to the objective, of a magazine movably mounted with respect to the support, means carried by the magazine and operable through moving the magazine to an operable position against the support for holding the film flat on the relatively fixed exposure frame, said means being movably mounted with respect to the magazine.

18. In a magazine camera, the combination with a support including a film driving member, an objective, and an exposure frame plate fixedly located with respect to the objective, of a magazine movably mounted with respect to the support, means carried by the magazine and operable through moving the magazine to an operable position against the support for holding the film flat on the relatively fixed exposure frame, said means being movably mounted on the magazine, and a spring for normally thrusting said means in one direction.

19. In a magazine camera, the combination with a support including a film driving member, an objective, and an exposure frame plate fixedly located with respect to the objective, of a magazine movably mounted with respect to the support, a presser member carried by said magazine, means for limiting the movement of the presser member relative to the magazine, and a spring for thrusting the presser member toward one limit of its movement.

20. In a magazine camera, the combination with a support including a film driving member, an objective, and an exposure frame plate fixedly located with respect to the objective, of a magazine movably mounted with respect to the support, means carried by the magazine and operable through moving the magazine to an operable position against the support for holding the film flat on the relatively fixed exposure frame, said means being movably mounted with respect to the magazine and means on the magazine cooperating with the film driving member.

21. In a magazine for cameras, the combination with a casing, of a pair of film supports in the casing, an opening through walls of the casing adapted to expose a length of film, a housing behind said opening, a film presser member mounted in said housing being movably mounted with respect thereto, means for limiting the movement of the presser member with respect to the casing, and a spring acting on said presser.

22. In a magazine for cameras, the combination with a casing having an opening in a wall thereof, of a pair of film supports carried by the casing, light tight means for directing a film past the opening from one reel support to the other, and a film presser adapted to engage a film portion at the aperture in the casing, and a spring for engaging and exerting an outward force upon said presser.

23. In a magazine for cameras, the combination with a casing having an opening in a wall thereof, of a pair of film supports carried by the casing, film passing from one support to the other past said opening, and means located in the opening including a presser member for contacting with a width of film lying over said opening and adapted to exert an outward thrust thereon.

24. In a magazine for cameras, the combination with a casing having an opening of greater width than the width of a film adapted to be contained therein in a wall of said casing, and means inside of the casing adjacent said opening for exerting an outward thrust upon a film extending across said opening.

25. In a magazine for cameras, the combination with a casing having an opening in walls thereof, a pair of film supports in the casing adapted to support the ends of a film extending across said opening in the casing, and means inside the casing tending to press said film extending across said opening away from said magazine.

26. In a magazine for cameras having an objective and a fixed rearwardly extending frame defining a focal plane of the objective, the combination with a window in the magazine of greater size than the rearwardly extending camera frame and adapted to permit the frame to pass into the magazine into contact with film contained therein.

27. In a magazine for cameras including an objective and a frame over which film may be drawn in the focal plane of the objective, the combination with a supply and take-up coil of film in the magazine, a window in the magazine, means for guiding film past the window, said window being of such size that it is adapted to permit the camera frame to pass through the window into contact with film contained in the magazine and guided past the window.

28. In a magazine adapted to be used with cameras including an objective, shutter and frame defining the focal plane of said objective, the combination with a housing forming a light tight closure for film, guides adapted to direct film past an exposure aperture in the magazine, said exposure aperture being of such size as to permit the frame on the camera to project into the interior of the magazine and to contact with the length of film guided past the exposure aperture, and light retarding devices associated with the film guides and exposure aperture to protect film in the magazine from unnecessary exposure.

29. In a film camera with interchangeable cassette and a film guide channel located in the interior of the camera behind its objective, a guide plate carrying the window for the image and permanently located behind the objective and in its focus, and a pressure plate independently mounted on said cassette.

30. In a film camera with interchangeable cassette on a film guide channel located in the interior of the camera behind its objective, a guide plate located behind the objective and in its focus, a pressure plate mounted on said cassette, a recess in the side of said cassette across which the film is guided so that said pressure plate is able to engage said recess behind the film.

ROY S. HOPKINS.